United States Patent
Takahashi et al.

(10) Patent No.: US 9,361,680 B2
(45) Date of Patent: Jun. 7, 2016

(54) IMAGE PROCESSING APPARATUS, IMAGE PROCESSING METHOD, AND IMAGING APPARATUS

(71) Applicant: CANON KABUSHIKI KAISHA, Tokyo (JP)

(72) Inventors: Takahiro Takahashi, Yokohama (JP); Keiichiro Ishihara, Yokohama (JP); Satoru Komatsu, Yokohama (JP); Shin Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/444,119

(22) Filed: Jul. 28, 2014

(65) Prior Publication Data
US 2015/0043808 A1  Feb. 12, 2015

(30) Foreign Application Priority Data
Aug. 7, 2013  (JP) ................. 2013-164405

(51) Int. Cl.
*G06K 9/00* (2006.01)
*G06T 5/50* (2006.01)
*G06T 7/00* (2006.01)
*H04N 13/00* (2006.01)
*G06T 5/00* (2006.01)

(52) U.S. Cl.
CPC . *G06T 5/50* (2013.01); *G06T 5/003* (2013.01); *G06T 7/0059* (2013.01); *H04N 13/0022* (2013.01); *G06T 2207/10004* (2013.01); *G06T 2207/10028* (2013.01); *G06T 2207/20192* (2013.01)

(58) Field of Classification Search
None
See application file for complete search history.

(56) References Cited

U.S. PATENT DOCUMENTS

| 2008/0247670 A1* | 10/2008 | Tam et al. ..................... 382/298 |
| 2010/0239180 A1* | 9/2010 | Yea et al. ..................... 382/261 |
| 2011/0037877 A1 | 2/2011 | Tamaru |
| 2012/0250979 A1 | 10/2012 | Yokoyama et al. |
| 2012/0280996 A1* | 11/2012 | Kannan et al. ............... 345/426 |
| 2013/0300860 A1 | 11/2013 | Komatsu |

(Continued)

FOREIGN PATENT DOCUMENTS

| JP | H07-021365 A | 1/1995 |
| JP | 2009-157821 A | 7/2009 |

(Continued)

OTHER PUBLICATIONS

Oishi, Takeshi, et al. "Fast simultaneous alignment of multiple range images using index images." 3-D Digital Imaging and Modeling, 2005. 3DIM 2005. Fifth International Conference on. IEEE, 2005. 8 pages.*

(Continued)

*Primary Examiner* — Sumati Lefkowitz
*Assistant Examiner* — Ryan P Potts
(74) *Attorney, Agent, or Firm* — Fitzpatrick, Cella, Harper & Scinto

(57) ABSTRACT

An image processing apparatus comprising: an image acquisition unit configured to acquire an image; a depth map acquisition unit configured to acquire a depth map corresponding to the image; a refinement unit configured to detect a saliency region from the image and to refine the depth map on the basis of the saliency region, the saliency region being a region on which a person tends to focus; and an image processing unit configured to apply image processing to the image using the depth map refined by the refinement unit.

20 Claims, 9 Drawing Sheets

(56) References Cited

U.S. PATENT DOCUMENTS

| | | |
|---|---|---|
| 2013/0307966 A1 | 11/2013 | Komatsu |
| 2014/0093159 A1* | 4/2014 | Nguyen et al. ................. 382/154 |
| 2014/0152647 A1* | 6/2014 | Tao et al. ...................... 345/419 |
| 2014/0211045 A1 | 7/2014 | Tanaka |

FOREIGN PATENT DOCUMENTS

| | | | |
|---|---|---|---|
| JP | 2011-041089 A | 2/2011 | |
| JP | 2012-208671 A | 10/2012 | |
| JP | 2013-005025 A | 1/2013 | |
| JP | 5151472 B2 | 2/2013 | |
| WO | WO 2013145554 A1 * | 10/2013 | |

OTHER PUBLICATIONS

U.S. Appl. No. 14/340,824, filed Jul. 25, 2014, Takahiro Takahashi et al.
U.S. Appl. No. 14/453,888, filed Aug. 7, 2014, Satoru Komatsu.
U.S. Appl. No. 14/457,482, filed Aug. 12, 2014, Shin Tanaka.
U.S. Appl. No. 14/457,507, filed Aug. 12, 2014, Keiichir Ishihara.
U.S. Appl. No. 14/528,250, filed Oct. 30, 2014, Satoru Komatsu.

* cited by examiner

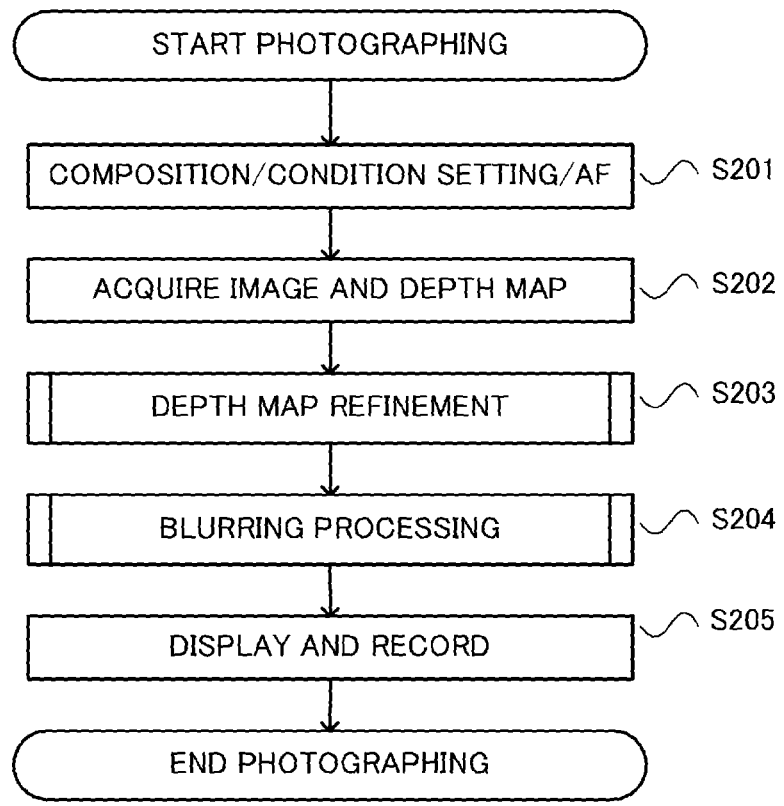
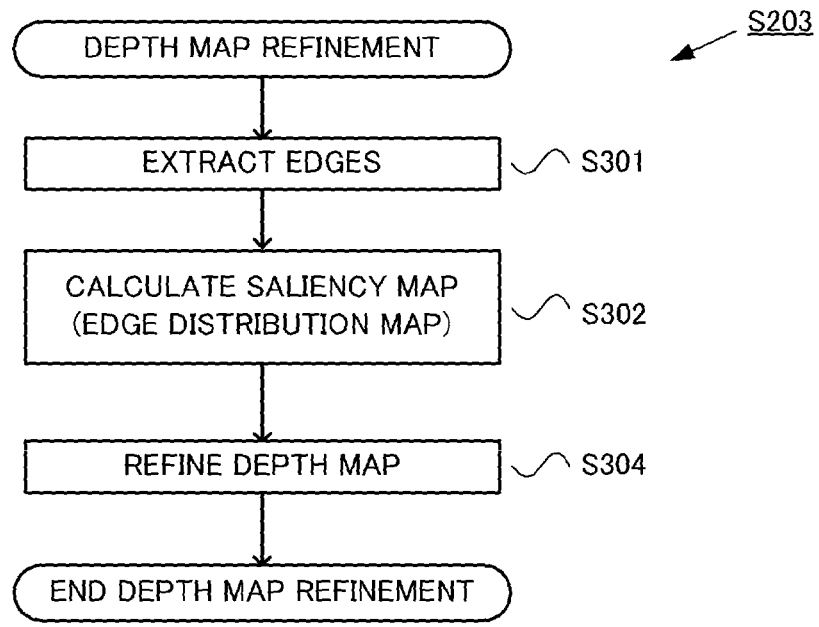

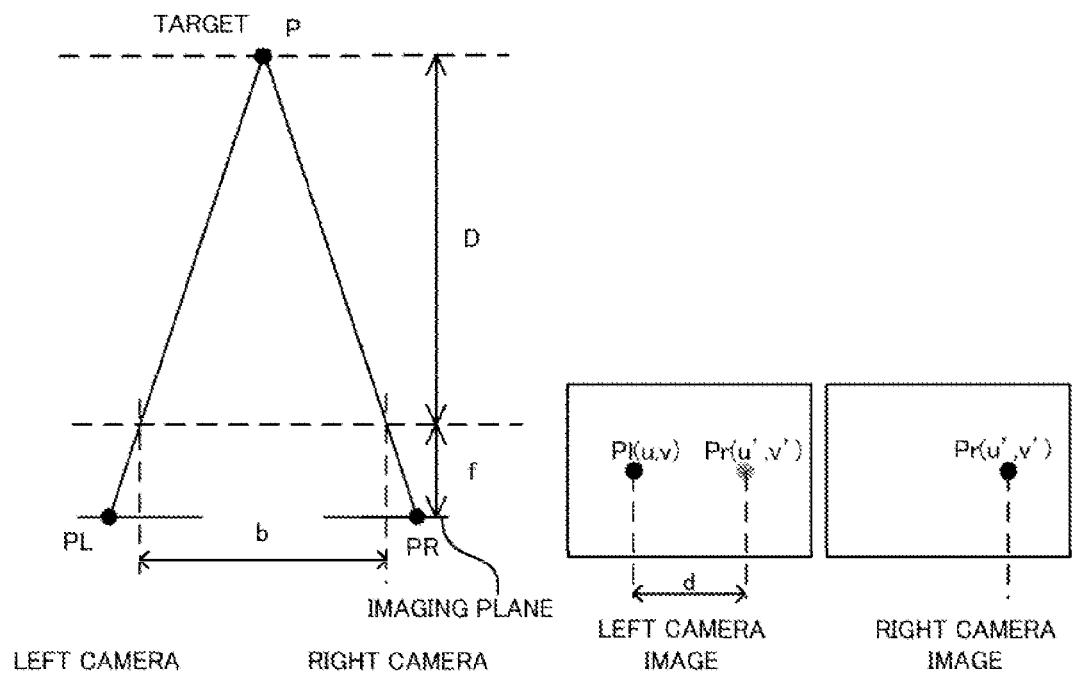
FIG. 5A
PRIOR ART
FIG. 5B
PRIOR ART
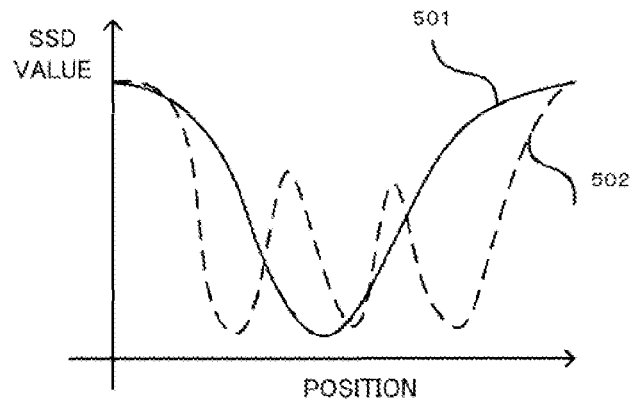
FIG. 5C
PRIOR ART

IMAGE PROCESSING APPARATUS, IMAGE PROCESSING METHOD, AND IMAGING APPARATUS

BACKGROUND OF THE INVENTION

1. Field of the Invention

The present invention relates to an image processing apparatus, and specifically relates to an image processing apparatus that applies image processing to a viewing image using depth information.

2. Description of the Related Art

In recent years, an imaging apparatus has been developed that is capable of simultaneously acquiring a viewing image and a depth map representing a depth to a scene being photographed. As a system for acquiring the depth map, there are a plurality of systems. For example, there is a stereo system for acquiring images from a plurality of visual point positions and calculating a depth on the basis of the principle of triangulation using a parallax calculated from a correspondence relation among pixels in the images. There are also a depth from defocus (DFD) system and a depth from focus (DFF) system for analyzing blurring states of a plurality of images acquired under shooting conditions in which blurring states are different such as focus positions and stops and calculating a depth. Further, there is a time of flight (TOF) system for calculating a depth on the basis of light velocity and time from when light is emitted from a light source until the light reaches a sensor after being reflected on an object.

There is a technique for generating, using a viewing image and a depth map, an image capable of representing, even in a digital camera including a small aperture lens, a shallow depth of field in a digital camera including a large aperture lens (e.g., Patent Literature 1). An image processing apparatus disclosed in Patent Literature 1 is briefly explained. The image processing apparatus includes an imaging system configured to photograph a viewing image and a three-dimensional measuring unit configured to acquire a depth map representing a depth of a photographing scene. First, the image processing apparatus acquires the viewing image and the depth map from the imaging system and the three-dimensional measuring unit. Subsequently, the image processing apparatus generates a parameter concerning a point image distribution of a blur using the depth map. The image processing apparatus applies filter processing having a low-pass characteristic to the viewing image using the parameter to generate an image having a stereoscopic effect with a reduce depth of field. Contrary to applying blurring processing, it is also possible to apply image restoration processing using a filter having a characteristic opposite to the point image distribution corresponding to a depth. This makes it possible to realize image restoration corresponding to the depth and acquire a higher definition image.

On the other hand, there has been disclosed an image processing method of representing a depth of field like a depth of field of an image photographed by an actual camera using three-dimensional computer graphics (3DCG) (e.g., Patent Literature 2). Specifically, a depth from an imaginary camera is calculated in a 3DCG scene, the depth is divided into a plurality of zones of depths, and a blurring amount is determined from a depth representing the zones. Subsequently, blurring processing is applied to the zones with the calculated blurring amount to generate a 3DCG image that reproduces a shallow depth of field like a depth of field of an image photographed by the actual camera. Such a method can also be applied when image restoration is performed. Therefore, it is possible to realize an increase in speed.

Patent Literature 1: Japanese Patent Application Laid-Open No. H07-21365
Patent Literature 2: Japanese Patent Application Laid-Open No. 2011-41089

SUMMARY OF THE INVENTION

In the various depth map acquisition systems explained above, a depth cannot be sometimes acquired for each of the systems. For example, in the case of the stereo system, it is necessary to find corresponding places among images. However, there are regions where the correspondence cannot be found such as regions without a texture and regions having the same texture. In the case of the DFD system and the DFF system, a depth cannot be calculated in pixels in which a difference in a blur cannot be detected such as regions without a texture. In the case of the TOF system, a depth cannot be calculated, for example, in a substance from which light is not reflected or under strong external light intensity of the sun or the like. Even if a depth is calculated, the accuracy of the depth might not be high. In this way, because of causes peculiar to the respective systems, in some cases, a depth map cannot be acquired or the accuracy of a depth map is not high. Therefore, when it is attempted to generate an image having a shallow depth of field using depth information or when image restoration is performed using the depth information as in Patent Literature 1, a marked sense of discomfort occurs in an image in a region where a highly accurate depth map cannot be acquired.

Even when an ideal depth map can be acquired, there is still a problem. Specifically, as in Patent Literature 2, when a depth is divided into several zones in a depth direction, a region on which a person tends to focus (hereinafter, saliency region) is sometimes divided into a plurality of depths. In such a case, even if a depth map is ideal, when image processing based on the depth map is performed, a boundary line, which should be originally absent, is seen in the saliency region.

In view of the problems, it is an object of the present invention to reduce image deterioration when image processing is applied using a depth map.

In order to solve the above problem, the first aspect of the present invention provides an image processing apparatus comprising: an image acquisition unit configured to acquire an image; a depth map acquisition unit configured to acquire a depth map corresponding to the image; a refinement unit configured to detect a saliency region from the image and to refine (correct) the depth map on the basis of the saliency region, the saliency region being a region on which a person tends to focus; and an image processing unit configured to apply image processing to the image using the depth map refined (corrected) by the refinement unit.

The second aspect of the present invention provides an image processing method performed by an image processing apparatus, the image processing method comprising: an image acquisition step of acquiring an image; a depth map acquisition step of acquiring a depth map; a detecting step of detecting a saliency region from the image, the saliency region being a region on which a person tends to focus; a refinement step of refining the depth map on the basis of the saliency region; and an image processing step of applying image processing to the image using the depth map refined (corrected) in the refinement step.

According to the present invention, it is possible to reduce image deterioration when image processing is applied using a depth map.

Further features of the present invention will become apparent from the following description of exemplary embodiments with reference to the attached drawings.

BRIEF DESCRIPTION OF THE DRAWINGS

FIG. 2 is a flowchart for explaining the operation of the imaging apparatus according to the first embodiment;

FIG. 3 is a flowchart for explaining the operation of depth map refinement according to the first embodiment;

FIGS. 5A to 5C are schematic diagrams for explaining the principle of a stereo system;

DESCRIPTION OF THE EMBODIMENTS

First Embodiment

Figure 1:
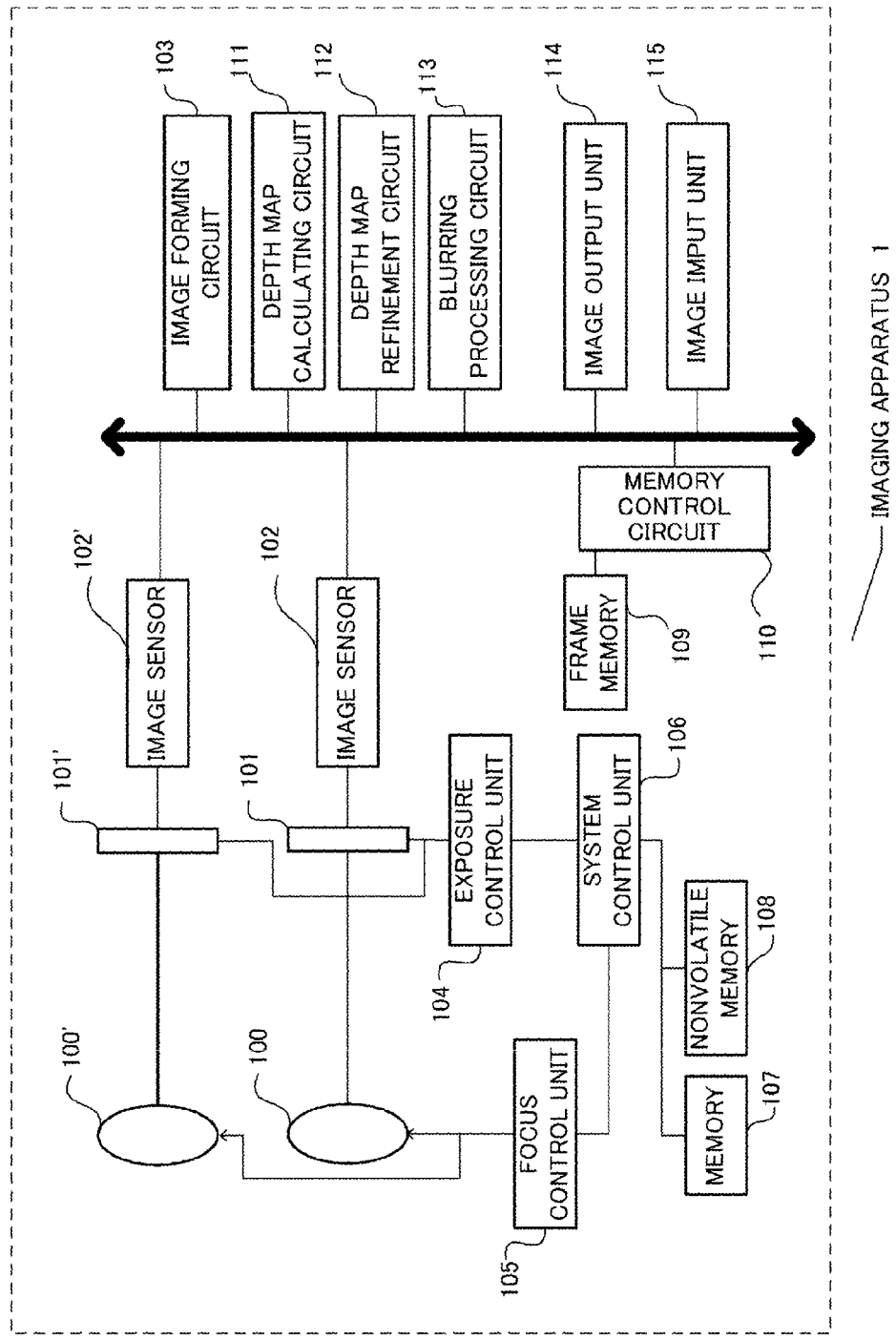
FIG. 1 is a block diagram showing the configuration of an imaging apparatus according to a first embodiment.

A specific embodiment of the present invention is explained below with reference to the drawings. An imaging apparatus according to this embodiment is an imaging apparatus capable of simultaneously acquiring a depth map and a viewing image. The imaging apparatus according to this embodiment includes two imaging systems and acquires a depth map in a stereo system. However, the scope of the invention is not limited to examples shown in the figures in the explanation of the embodiment.
<Configuration>
FIG. 1 schematically shows the configuration of an imaging apparatus 1 according to this embodiment. The imaging apparatus 1 includes two imaging systems. Optical systems 100 and 100' respectively include a plurality of lenses for guiding light from an object (object light) to image sensors 102 and 102'. Exposure control members 101 and 101' include diaphragms and shutters. The object light made incident via the optical systems 100 and 100' are made incident on the image sensors 102 and 102' via the exposure control members 101 and 101'. The image sensors 102 and 102' are elements that convert the object light into an electric signal and output the image signal. Typically, the image sensors 102 and 102' are configured by image sensors such as CCDs or CMOSs.

An image forming circuit 103 is an image forming circuit for digitizing and imaging an analog signal output from the image sensors 102 and 102'. The image forming circuit 103 acquires two images at different view points from the two imaging systems. The image forming circuit 103 stores one of the two images as an image for display (viewing). This image is referred to as viewing image. The image forming circuit 103 is configured by an analog/digital conversion circuit, an auto gain control circuit, an auto white balance circuit, an image interpolation processing circuit, a color conversion circuit, and the like which are not shown. The image forming circuit 103 is equivalent to an image acquisition unit in the present invention.

An exposure control unit 104 is a functional unit that controls the exposure control members 101 and 101'. A focus control unit 105 is a functional unit that controls focusing of the optical system 100. The exposure control unit 104 and the focus control unit 105 are controlled using, for example, a through the lens (TTL) system (a system for measuring light actually passed through a lens for photographing to control exposure and focus). A system control circuit 106 is a control circuit that manages the operation of the entire imaging apparatus 1. The system control circuit 106 performs control of an optical system for photographing and control for subjecting a photographed image to digital processing.

A memory 107 is a memory including a flash ROM that records data for operation control, a processing program, and the like used in the system control circuit 106. A nonvolatile memory 108 is a nonvolatile memory such as an electrically erasable and recordable EEPROM that stores information such as various adjustment values. A frame memory 109 is a frame memory that stores, for several frames, images generated by the image forming circuit 103. A memory control circuit 110 is a memory control circuit that controls image signals input to and output from the frame memory 109.

A depth map calculating circuit 111 calculates a depth map in the stereo system from two images in different visual point positions acquired by the optical systems 100 and 100', the exposure control members 101 and 101', and the image sensors 102 and 102'. The depth map calculating circuit 111 is equivalent to a depth map obtaining unit in the present invention.

A depth map refinement circuit 112 analyzes a viewing image of the two images, detects a saliency region, and corrects, on the basis of the detected saliency region, the depth map calculated by the depth map calculating circuit 111.

A blurring processing circuit 113 is a circuit that gives a blur to the viewing image using the depth map corrected by the depth map refinement circuit 112.

The image output unit 114 is an image output unit for displaying, on a not-shown image output device, an image applied with blurring processing in the blurring processing circuit 113. An input unit 115 is an input unit to which a user inputs operation for the imaging apparatus 1. The input unit 115 is configured by buttons, a touch panel, and the like.
(Processing Flow)
A flow of processing from a start to completion of photographing in this embodiment is explained with reference to flowcharts of FIGS. 2 to 4.

First, in step S201 in FIG. 2, a photographer performs zooming, determines a composition, at the same time, sets shooting conditions such as shutter speed and an F number, and performs focus adjustment with respect to a scene that the photographer desires to photograph.

Subsequently, in step S202, when a not-shown photographing start button is depressed, a viewing image and a depth map are acquired. Specifically, the image sensors 102 and 102' photoelectrically convert object light imaged via the optical systems 100 and 100'. The image forming circuit 103 applies predetermined signal processing to the object light, acquires two images, and records the two images in the frame memory 109. In this embodiment, of two images at different visual points acquired via the optical systems 100 and 100', an image acquired via the optical system 100 is set as a viewing image. The depth map calculating circuit 111 acquires the two images in different visual point positions and generates a depth map in the stereo system. The stereo system is briefly explained with reference to FIGS. 5A to 5C. FIG. 5A is a top schematic view of a situation in which a point P in a three-dimensional space is photographed by two cameras having the same focal length. It is assumed that optical axes of the imaging systems are parallel and adjusted to be set at the same height. FIG. 5B shows images acquired by left and right imaging apparatuses. It is assumed that the point P is projected on Pl(u, v) and Pr(u', v') of a left camera and a right camera. When a depth from the focal length to the point P is represented as D, the focal length of the imaging apparatuses is represented as f, a depth between the optical axes of the imaging apparatuses (hereinafter referred to as base line length) is represented as b, and a difference between positions Pl and Pr of the point P of images acquired by the cameras (hereinafter, parallax) is represented as d, the depth D can be calculated by Expression (1).

[Math. 1]
$$D = \frac{bf}{d} = \frac{bf}{u - u'} \quad (1)$$

Since the optical axes of the imaging apparatuses are adjusted to be parallel and at the same height, as indicated by Expression (1), only a change in the lateral direction has to be considered concerning the parallax d. When the optical axes and the heights of the imaging systems are not adjusted, it is necessary to adjust the optical axes and the heights beforehand. To calculate a depth map on the basis of Expression (1), it is necessary to calculate coordinates u and u' corresponding to pixels of the photographed two images. One of the left and right images is set as a reference image, a local region (e.g., 16×16 pixels) including the periphery of pixels of attention in the reference image is set as a template, and template matching for searching for a similar region from the other image is performed. In this embodiment, as an index for searching for the similar region, a sum of square difference (SSD) is used. As other indexes, there are various indexes such as a sum of absolute difference (SAD) and a regular cross-correlation. A method of finding the similar region is not particularly limited.

It is briefly explained using a graph of FIG. 5C what kind of distribution this index shows. In the graph of FIG. 5C, the abscissa indicates a position where similarity is calculated. The ordinate is a value indicating a similarity degree. A value of the SSD is shown. In the case of the SSD and the SAD, if regions are similar, a difference between the regions is small. A position with a minimum SSD value indicates highest similarity. In general, a distribution in the case of an ideal condition in which there is only one similar region has a unimodal shape convex downward like a curve 501. However, a distribution in the case of presence of similar textures has a multimodal shape having many ridges downward like a curve 502. Such a situation often occurs when the same texture repeatedly appears as in windows of a building, tiles, and the like. It is impossible to highly reliably calculate which position is a true corresponding pixel. As another low-reliability case, similarity is equal to or larger than a certain value (in the case of a correlation, equal to or smaller than the certain value). In such a situation, a corresponding pixel is absent because of occlusion or a texture itself is absent. In principle, a depth cannot be calculated in a region. The region with low reliability is stored as a low-reliability region and used in depth map refinement processing in a later stage. The reliability is either high reliability or low reliability. However, the reliability may be three or more classifications or continuous values. In that case, in the depth map refinement processing in the later stage, a region with reliability equal to or lower than a predetermined threshold only has to be determined as the low-reliability region.

In a region with high reliability of depth calculation, the coordinate u' can be calculated. A depth map is calculated using Expression (1). Even in a region with low reliability of depth calculation, a depth of the region may be calculated as long as the depth can be calculated.

Figure 6A:
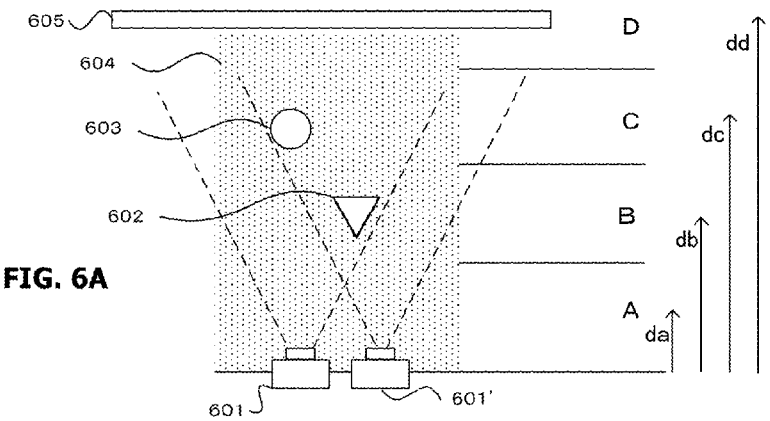
FIGS. 6A to 6K are schematic diagrams for explaining the depth map refinement and the blurring processing according to the first embodiment.
Figure 6B:
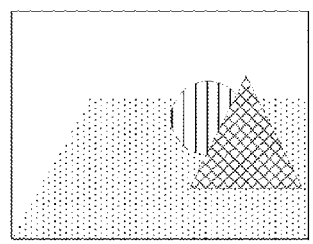
Figure 6C:
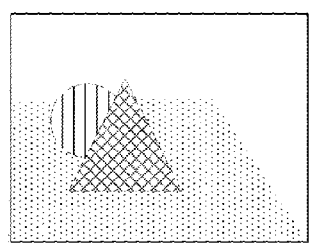
Figure 6D:
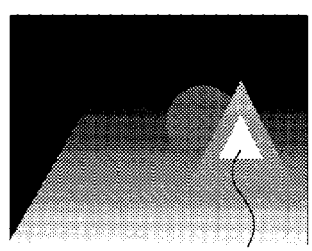

The state explained above is briefly explained with reference to FIGS. 6A to 6K. FIG. 6A is a top schematic diagram of a scene set as a photographing target. The scene is photographed by cameras 601 and 601'. Objects 602 and 603 are arranged on an object 604. An object 605 is arranged in a most distant place. FIG. 6B shows an image (a viewing image) photographed by the camera 601. FIG. 6C shows an image photographed by the camera 601'. A result acquired by calculating a depth map from the two images is shown in FIG. 6D. Since regularity of a texture of the object 602 is high, a region 606 shown in FIG. 6D is stored as a low-reliability region.

In step S203, the depth map refinement circuit 112 analyzes the viewing image and corrects, on the basis of an analysis result, the depth map generated in step S202. Details of this step are explained with reference to the flowchart of FIG. 3.

Figure 6E:
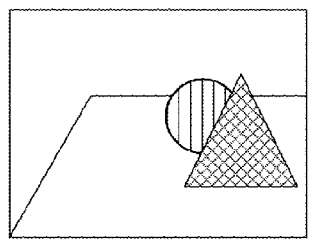

In step S301, the depth map refinement circuit 112 creates an edge image from the viewing image (FIG. 6B). A Canny edge detection algorithm of an edge image generation system is used. The edge image generation system is not particularly limited. However, it is desirable to perform edge detection after applying low-pass filter processing beforehand to prevent a noise component from being detected as an edge. In this way, a binary image of extracted edges is generated. The edge image is shown in FIG. 6E.

Subsequently, in step S302, the depth map refinement circuit 112 calculates how edges are distributed in the image and calculates a saliency map representing a region on which a person tends to focus (a saliency region). The region on which the person tends to focus is mainly a region including a large number of edges or a region of a character, a straight line, or the like. In step S302, specifically, the depth map refinement circuit 112 detects, in the edge image generated in step S301, the saliency region on the basis of Expression (2) and generates the saliency map.

[Math. 2]
$$S(x, y) = \frac{\sum_M E(x - i, y - i)}{m \times m} \quad (2)$$

where, S(•) represents the saliency map, E(•) represents an edge image, M represents a region of m×m pixels, and i and j represent −m/2≤i and j≤m/2. The depth map refinement circuit 112 converts the saliency map S into a binary image using a predetermined threshold and generates a final saliency map S. A region where a value of Expression (2) is equal to or larger than the predetermined threshold is the saliency region. That is, in this embodiment, a region where the intensity of an edge component is equal to or larger than the predetermined threshold is calculated as the saliency region.

A very small edge component is deleted from the saliency map because the very small edge component is not often sensed by the person and is not important. As a method for the deletion, Morphorogy processing, thinning processing, or the like can be adopted. The method is not particularly limited. The saliency map created as explained above is shown in FIG. 6F. As shown in the figure, it is seen that a region that the person tends to visually sense can be acquired in the saliency map.

Figure 6F:
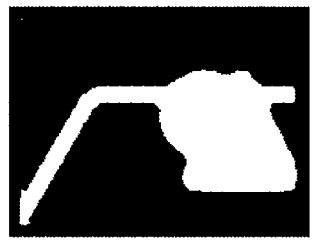
Figure 6G:
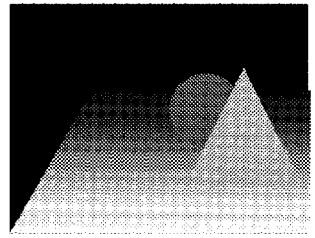

Subsequently, in step S304, the depth map refinement circuit 112 corrects the depth map generated in step S202 using the saliency map created in step S303. A state of the refinement is explained with reference to FIGS. 6B, 6D, 6F, and 6G. FIGS. 6B and 6D are the viewing image and the depth map acquired in step S202. The region 606 shown in FIG. 6D is stored as a region with low reliability. On the other hand, FIG. 6F is the saliency map created from the edge image shown in FIG. 6E. A white region represents a region on which the person tends to focus. When a region for which a depth is not calculated or a region for which a wrong depth is calculated is present in the saliency region, the person tends to have a sense of discomfort concerning an image acquired as a result of the image processing in the later stage. The region for which a depth is not calculated or the region for which a wrong depth is calculated is a region with low reliability of depth calculation (a low-reliability region). Therefore, the depth map refinement circuit 112 performs refinement of a depth in the low-reliability region 606 shown in FIG. 6D. Specifically, the depth map refinement circuit 112 calculates AND (logical product) of the low-reliability region and the saliency map and corrects a depth of the remaining region (a region with low reliability and saliency) from a depth map around the region. As a refinement method, any method can be adopted as long as a depth in a refinement target region can be corrected to smoothly change. For example, the depth can be calculated by interpolation from a depth in the depth map around the refinement target. As an interpolation method, any existing method can be adopted. According to the steps explained above, a smooth and ideal depth map shown in FIG. 6G can be acquired from the depth map shown in FIG. 6D. The depth in the refinement target region may be set to a single value.

Subsequently, in step S204 in FIG. 2, the blurring processing circuit 113 generates a blurred image with a reduced depth of field using the viewing image acquired in step S202 and the depth map corrected in step S203. A flow of this processing is explained with reference to the flowchart of FIG. 4 and the schematic diagrams of FIGS. 6A to 6K.

First, in step S401, the blurring processing circuit 113 sets d representing a target depth layer to N representing a most distant scene. This step is explained in detail with reference to FIGS. 6A to 6K. The blurring processing circuit 113 divides the depth map (FIG. 6G) corrected in step S203 in the depth direction. In this example, as shown in FIG. 6A, the depth map is divided into four layers A, B, C, and D in the depth direction. Depths of the layers from the cameras are represented as da, db, dc, and dd. The number of divisions is not limited to four and may be any number.

Figure 6H:
Figure 6I:
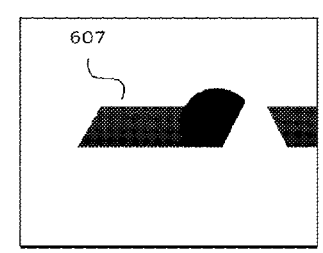
Figure 6J:
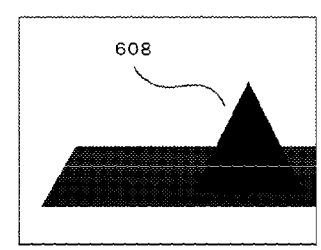
Figure 6K:
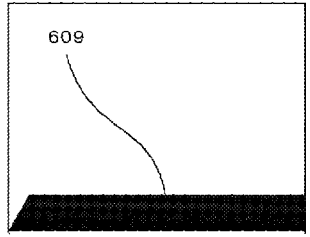

Subsequently, in step S402, the blurring processing circuit 113 determines a blurring amount of the depth layer d. Specifically, the blurring processing circuit 113 determines a filter size and a coefficient for performing blurring processing of a region present in the depth layer d. The determination can be realized by referring to a table determined beforehand with respect to the depth of the depth layer d. In the case of an example shown in FIGS. 6A to 6K, the blurring processing is applied to blacked regions shown in FIGS. 6H to 6K. FIG. 6H shows the region D in the depth direction. FIG. 6I corresponds to the region C. FIG. 6J corresponds to the region B. FIG. 6K corresponds to the region A. As the coefficient of the filter, a desired shape such as a circular shape or a Gaussian shape is set beforehand as a blurring processing result. However, the filter size and the coefficient may be calculated using a predetermined relational expression with respect to a depth. A method of realizing the filter size and the coefficient is not limited.

Subsequently, in step S403, the blurring processing circuit 113 performs blurring processing for the depth layer d. Specifically, the blurring processing circuit 113 performs a product-sum operation as indicated by Expression (3) using the filter determined in step S402.

[Math. 3]

$$G(x,y)=\Sigma_{i,j\in M,N}h(i,j)*O(x-i,y-j) \quad (3)$$

where, G(•) represents a pixel value after the blurring processing, O(•) represents a viewing image, h(•) represents the coefficient of the filter, and M and N represent sizes of the filter. The filter coefficient is normalized to set $\Sigma h=1$. Consequently, filter processing having a low-pass characteristic corresponding to the depth layer d is executed.

Subsequently, in step S404, the blurring processing circuit 113 performs synthesis of a result of the blurring processing and a result of the processing applied earlier. Specifically, the blurring processing circuit 113 combines an image Md acquired by applying the blurring processing to the depth layer d with the blurred image acquired before the image Md on the basis of Expression (4).

[Math. 4]

$$\begin{aligned} M &= M_d + M \quad \text{if } 1 \leq d \leq N-1 \\ &= M_d \quad \quad \text{if } d = N \end{aligned} \quad (4)$$

Subsequently, the blurring processing circuit 113 shifts to step S405 and determines whether the depth layer d currently being processed is larger than 1. When the depth layer d is larger than 1, the blurring processing circuit 113 shifts to step S406, subtracts 1 from d, and resumes the processing from step S402. When d decreases to 1, the blurring processing circuit 113 ends the generation of the blurred image and shifts to step S205.

In step S205, the blurring processing circuit 113 transfers the generated blurred image to the image output unit 114 and displays the blurred image on a not-shown image output device. At the same time, the blurring processing circuit 113 applies predetermined compression processing or the like to the blurred image and records the blurred image in a not-shown recording device.

According to the processing explained above, it is possible to analyze the viewing image, detect a region on which the person tends to focus, and concentratedly correct the region in the depth map. As a result, in the blurring processing in the later stage, it is possible to generate an image without a sense of discomfort, in particular, in the region on which the person tends to focus.

In this embodiment, the blurring processing performed using the depth map is explained. However, this system can also be applied to image restoration processing for changing parameters according to a depth to restore the resolution of an image, super-resolution processing, and the like. Specifically, the blurring processing shown in FIG. 4 only has to be replaced with the image restoration processing or the super-resolution processing. That is, it is possible to execute the image restoration processing or the super-resolution processing by determining a blurring amount in step S402 in FIG. 4 and performing inverse filtering for correcting (refining) the blurring amount in step S403.

In this embodiment, the depth in the depth map is divided into several depth layers and the image processing is applied for each of the depth layers. However, the image processing may be applied on the basis of an original depth value.

Second Embodiment

A second embodiment is an imaging apparatus in which a DFD system is used as a depth map acquiring system. In the following explanation, image processing for reducing a depth of field is applied to a viewing image using a depth map. However, as in the first embodiment, this embodiment can also be applied to image restoration processing, super-resolution processing, and the like.

Figure 7:
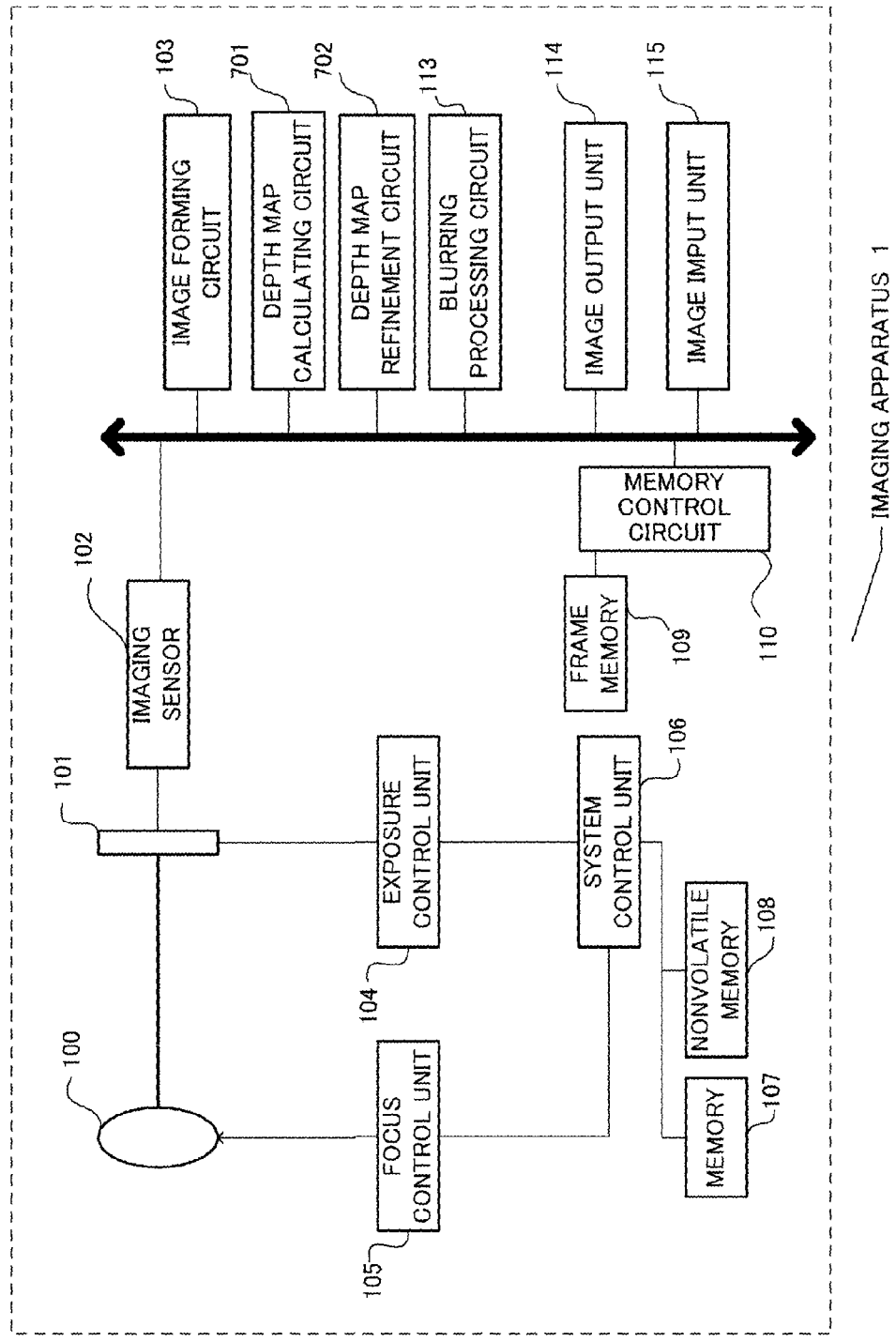
FIG. 7 is a block diagram showing the configuration of an imaging apparatus according to a second embodiment.

The configuration of the imaging apparatus in this embodiment is shown in FIG. 7. Among reference numerals in FIG. 7, the reference numerals same as the reference numerals in the configuration diagram of FIG. 1 denote the same components. Therefore, only different components are explained.

A depth map calculating circuit 701 shown in FIG. 7 calculates a depth map in the DFD system. A depth map refinement circuit 702 is a circuit that corrects the depth map calculated by the depth map calculating circuit 701.

Figure 8:
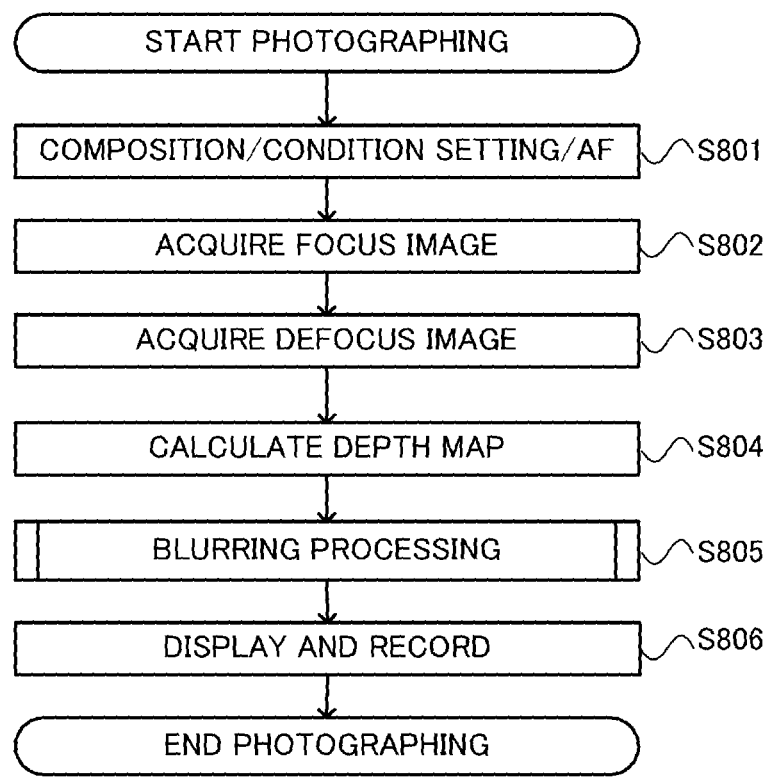
FIG. 8 is a flowchart for explaining the operation of the imaging apparatus according to the second embodiment.

A flow of the processing in this embodiment is explained with reference to a flowchart of FIG. 8.

In step S801, a photographer performs zooming on the scene to be photographed and determines a composition. Exposure control, focus control, and the like are performed and shooting conditions are determined.

In step S802, when a not-shown photographing start button is depressed, the system control circuit 106 starts photographing of a focus image (a viewing image) focused on an object. Specifically, the image sensor 102 photoelectrically converts object light imaged via the optical system 100 and generates an analog signal corresponding to object brightness. Thereafter, the analog image signal generated by the image sensor 102 is converted into a digital image via the image forming circuit 103 and recorded in the frame memory 109.

In step S803, the system control circuit 106 changes any one or a plurality of conditions of shooting conditions such as a focus position, an aperture stop, and a focal length such that blurring states of the focus image photographed in step S802 and the object change and performs the photographing in the same manner. The shooting conditions may be changed in any way as long as different degrees of a blur can be acquired with respect to the same object. A photographed image is recorded in the frame memory 109 as in step S802. The image acquired in step S802 is a defocus image defocused from the object. The photographing in step S801 and the photographing in step S802 are desirably continuously performed within a short time to prevent deviation from occurring in the position of the object.

Figure 10:
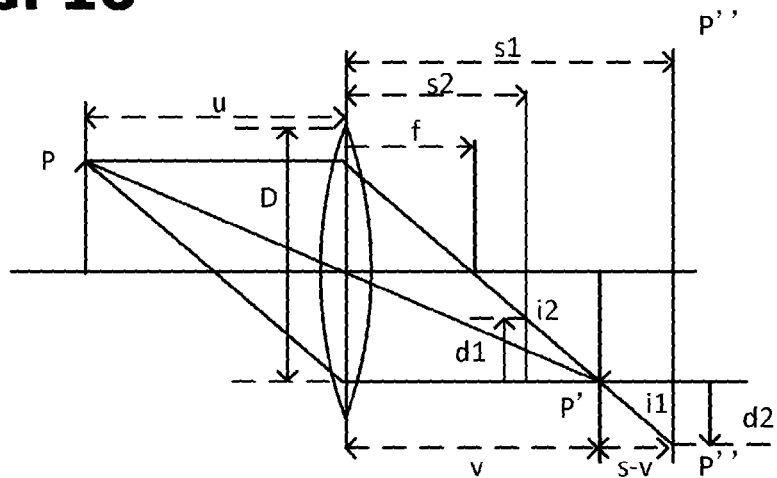
FIG. 10 is a schematic diagram for explaining the principle of a DFD system.

In step S804, the depth map calculating circuit 701 calculates a depth map using the focus image and the defocus image stored in the frame memory 109. First, the depth map calculating circuit 701 corrects positional deviation due to a camera shake during the photographing of the focus image and the defocus image. Specifically, the depth map calculating circuit 701 calculates a motion vector between two images and corrects positional deviation in up, down, left, and right directions. A method of the refinement is not particularly limited. An affine transformation coefficient, a projective transformation coefficient, and the like may be estimated from a relation of corresponding pixels of the two images to correct the positional deviation. A method of the refinement is not particularly limited. It is assumed that an image acquired by correcting (refining) the positional deviation with respect to the defocus image is generated. Subsequently, the depth map calculating circuit 701 calculates a depth map from the focus image and the defocus image in which the positional deviation is corrected. The depth map is calculated in the DFD system. The principle of the DFD system is briefly explained with reference to FIG. 10. In FIG. 10, a depth u to a target object P can be calculated on the basis of Expression (5) using a focal length f of a lens if a position v where the target object P is focused is known.

[Math. 5]

$$\frac{1}{f} = \frac{1}{u} + \frac{1}{v} \tag{5}$$

In the DFD system, based on the premise that an imaging plane position and a focusing position of the target object P are different, the focus position v is calculated from a degree of a blur of an image projected on the imaging plane and substituted in Expression (5) to calculate a depth to the target object P. When the focus position v is present on an imaging plane s1, a point on an object surface at the depth u is diffused to a circle called diffusion circle on the imaging plane and forms an image i1 represented by Expression (6).

[Math. 6]

$$i_1 = h_1 * i_0 \tag{6}$$

where, * indicates a convolutional operation, i0 indicates an image in the focused position, and h1 indicates a point spread function (PSF).

The point spread function h1 depends on a diameter d1 of the diffusion circle proportional to a depth v-s1 between the imaging plane and the focused position. Therefore, a PSF model including a diffusion circle diameter as a parameter is assumed and the diffusion circle diameter d1 is estimated from the image i1. However, as it is seen from Expression (6), since the observation image i1 depends on the image i0 of the target object, the diffusion circle diameter d1 cannot be calculated in this state. Therefore, an observation image i2 in a different imaging plane position s2 is picked up and a ratio of the observation image i1 and the observation image i2 in a frequency domain of an image is calculated. Consequently, a relation between the observation images and the PSF can be derived as indicated by Expression (7).

[Math. 7]

$$\frac{I_1}{I_2} = H_1 \times \frac{I_0}{H_2 \times I_0} = \frac{H_1}{H_2} \tag{7}$$

where, I1, I2, I0, H1, and H2 respectively represent Fourier transform results of the observation images i1 and i2, the focused image i0, and the PSFs h1 and h2.

Ratios of PSFs subjected to the Fourier transform are calculated from optical system parameters beforehand to create a table. A depth value can be calculated from an actually-calculated ratio of the PSF. Consequently, it is possible to acquire a depth map using a difference in blurring states as a key.

Figure 11:
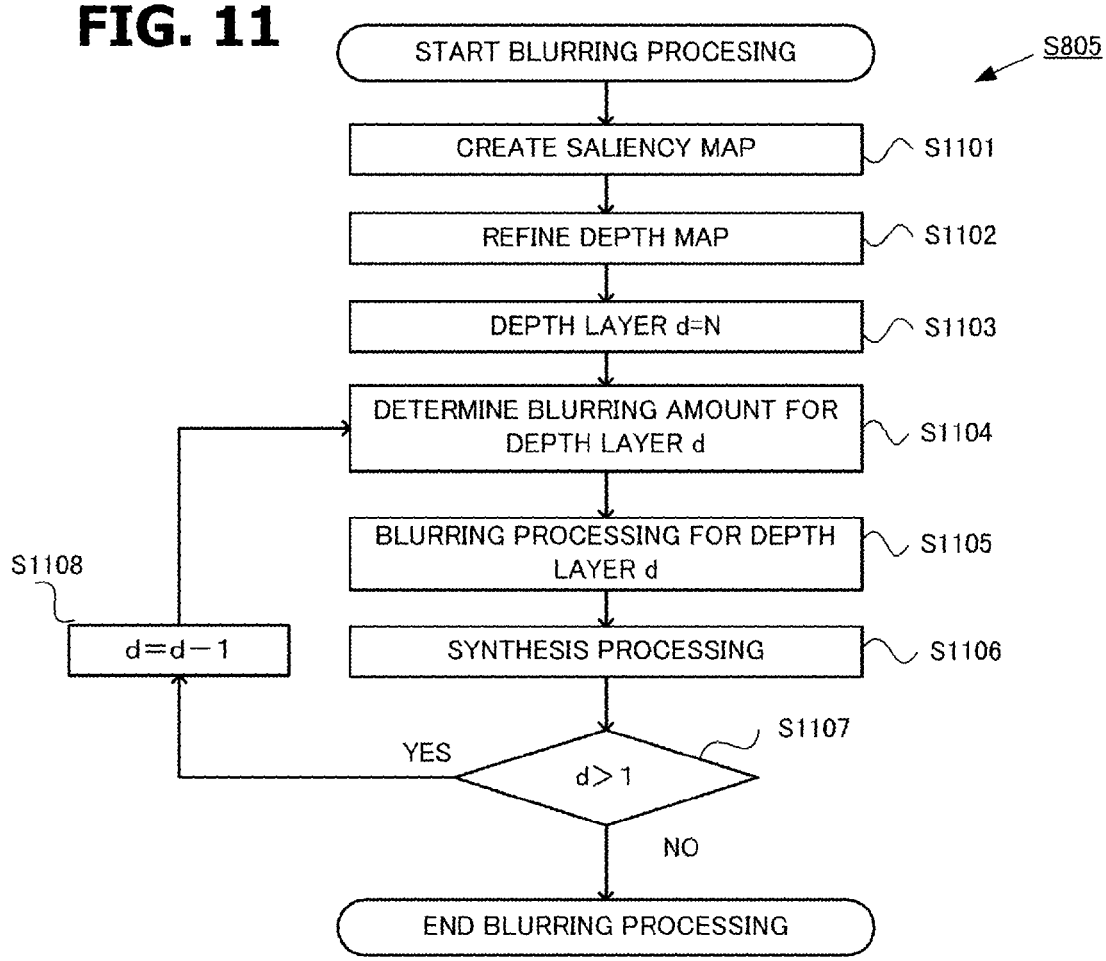
FIG. 11 is a flowchart for explaining the operation of the blurring processing according to the second embodiment.

Subsequently, in step S805, blurring processing for generating an image representing a shallow depth of field is performed using the focus image (the viewing image) photographed in step S802 and the depth map calculated in step S804. Details of this processing is explained with reference to a schematic diagram of FIGS. 9A to 9F and a flowchart of FIG. 11.

Figure 9A:
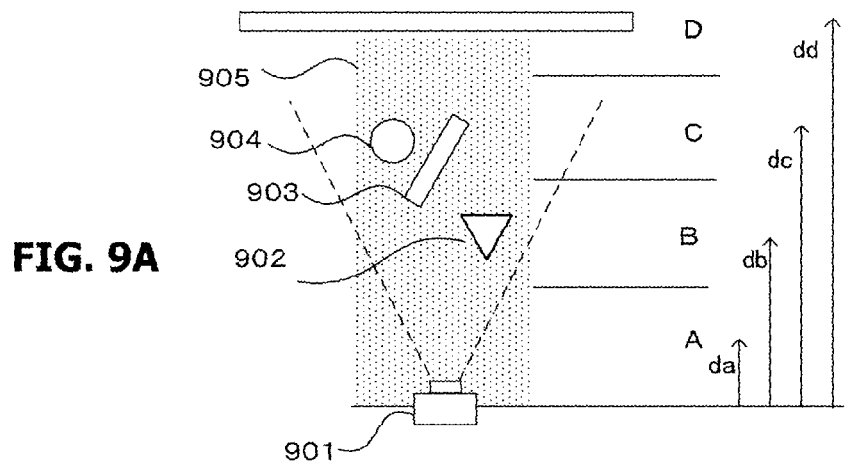
FIGS. 9A to 9F are schematic diagrams for explaining depth map refinement and blurring processing according to the second embodiment.

A top view of a photographing scene is shown in FIG. 9A. Reference numeral 901 denotes a photographing camera. The photographing camera 901 is photographing objects 902 to 906. This scene is divided into regions A to D in the depth direction. Depths da to dc corresponding to the regions are set as representative depths. The blurring processing is applied according to the depths.

Figure 9B:
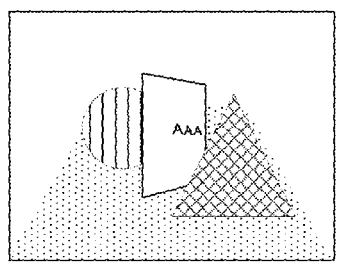
Figure 9C:
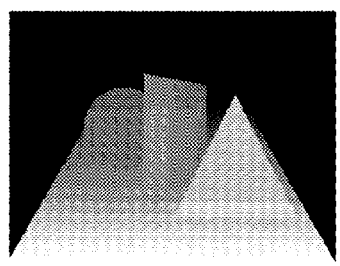
Figure 9D:
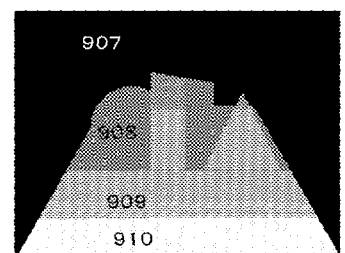
Figure 9E:
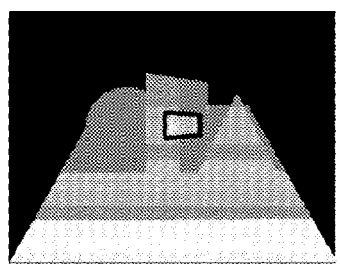
Figure 9F:
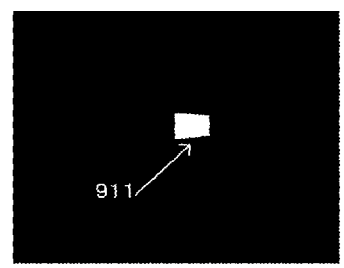

First, in step S1101, the depth map refinement circuit 702 creates a saliency map using the focus image acquired in step S802 and calculates a saliency map representing a region on which a person tends to focus (a saliency region). The region on which the person tends to focus is mainly a region of a character, a straight line, or the like. A detection method is as explained in the first embodiment. In the second embodiment, attention is paid to, in particular, a character region. FIG. 9B shows a focus image. A saliency map (FIG. 9F) with attention paid to the character region is generated from the focus image. In FIG. 9F, a region 911 is a region extracted as a region with high saliency.

Subsequently, in step S1102, the depth map refinement circuit 702 corrects a depth map using the saliency map. First, a continuous depth map shown in FIG. 9C is divided into four layers as shown in FIG. 9A in the same manner as in the first embodiment. A result of the division is shown in FIG. 9D. A region 910 corresponds to the depth layer A in FIG. 9A. A region 909 corresponds to a depth layer B. A region 908 corresponds to the depth layer C. A region 907 corresponds to the depth layer D. In the next step, different blurring amounts are given to the regions. Subsequently, the depth map refinement circuit 702 compares FIG. 9D and FIG. 9F and checks whether different depths are included in one saliency region. A state of the check is shown in FIG. 9E. A region surrounded by a thick line in FIG. 9E is a region corresponding to a character region of the saliency map (FIG. 9F). In this region, two depth layers, i.e., the depth layers B and C are included. Therefore, when the blurring processing is applied on the basis of the uncorrected depth map, since parameters of the blurring processing change in the character region, it is likely that the person senses a boundary that should originally be absent. Therefore, the blurring processing circuit 113 replaces depths of the salient region (the character region) including a plurality of depth layers with any one of the depth layers. Consequently, the person does not sense the boundary. It is possible to reduce image quality deterioration. During the replacement, the depths only have to be replaced with a value of a predominant depth in the region and unified. Consequently, the blurring processing having the same characteristic is performed in the region, a visual boundary line is not generated, and it is possible to reduce image quality deterioration. When a region that needs to be replaced is larger than a predetermined threshold (e.g., having a size equal to or larger than several % of an image) or when a large number of depths are distributed, the region does not have to be replaced.

In the example explained above, only one saliency region is included in the viewing image. However, when a plurality of saliency regions are included in the viewing image, the processing explained above only has to be applied to the respective saliency regions.

Subsequently, in step S1103, the blurring processing circuit 113 sets d representing a target depth layer to a most distant scene. In this embodiment, N=4.

Subsequently, in step S1104, the blurring processing circuit 113 determines a blurring amount of the depth layer d. Specifically, the blurring processing circuit 113 determines a filter size and a coefficient of the blurring processing in a region present in the depth layer d. As the coefficient of the filter, a desired shape such as a circular shape or a Gaussian shape is set beforehand as a blurring processing result. The filter size and the coefficient may be calculated using a relational expression with respect to a depth. A method of realizing the filter size and the coefficient is not limited.

Figure 4:
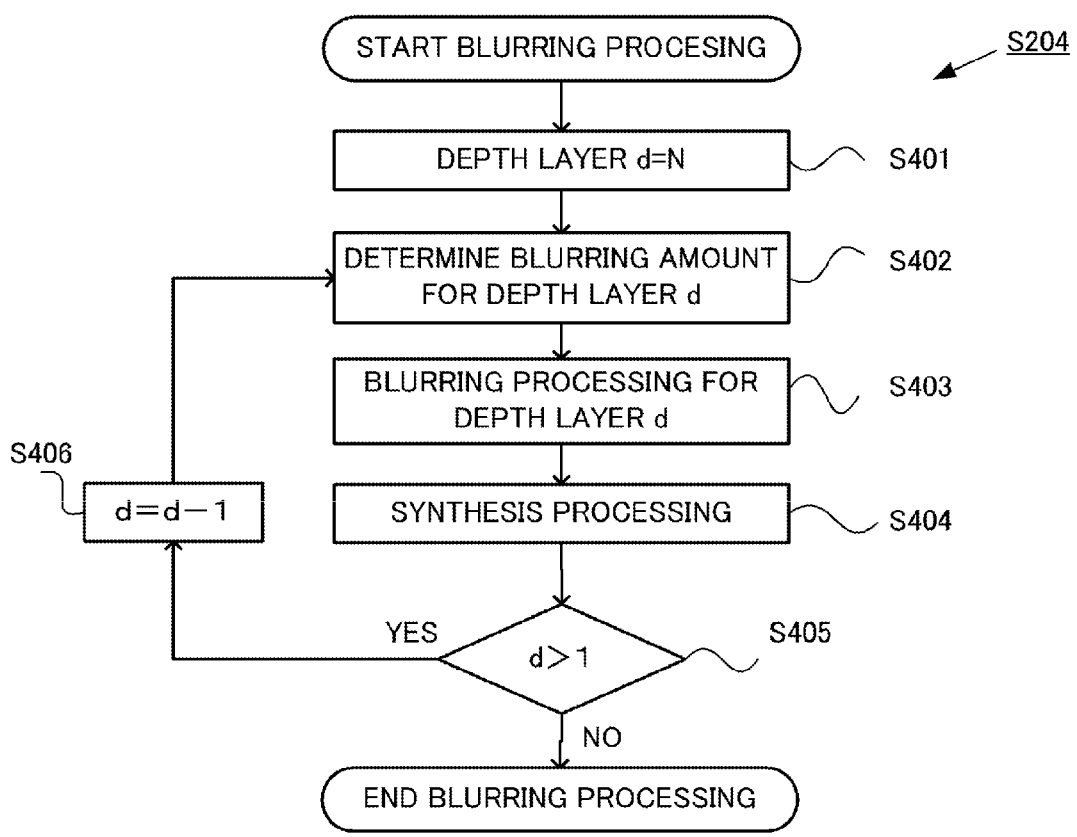
FIG. 4 is a flowchart for explaining the operation of blurring processing according to the first embodiment.

Subsequently, details of processing in steps S1105 to S1108 are the same as steps S403 to S405 of the flowchart of FIG. 4 in the first embodiment. Therefore, explanation of the details of the processing is omitted.

As explained above, when the depth map is divided in the depth direction to perform the blurring processing, even if the region on which the person tends to visually focus is divided, there is an effect that it is possible to reduce image deterioration by correcting (refining) the depth map using an analysis result of the viewing image. In this embodiment, the blurring processing is explained as the image processing in which the depth map is used. However, as in the first embodiment, this embodiment can also be applied to image restoration processing and super-resolution processing.

Other Embodiments

The element techniques explained in the first embodiment and the second embodiment can be combined as much as possible. For example, as the depth map acquisition system, the stereo system is adopted in the first embodiment and the DFD system is adopted in the second embodiment. However, these systems are not essential for the embodiments. In both of the embodiments, the depth map only has to be acquired by any method such as the stereo system, the DFD system, the DFF system, and the TOF system. As the saliency region, the edge region is detected in the first embodiment and the character region is detected in the second embodiment. These regions are not essential for the embodiments. The saliency region may be the edge region, the character region, or the straight line region or a combination of the regions as long as the region is a region on which the person tends to focus.

In the embodiments described above, the imaging apparatus that photographs the viewing image and the depth map is explained as an example. However, in the present invention, a method of the photographing is any method as long as the viewing image and the depth map can be acquired. The viewing image and the depth map do not always have to be acquired by the photographing. For example, an embodiment of the present invention is an image processing apparatus that acquires a viewing image and a depth map through a storage medium or a network and applies the processing explained above to the acquired viewing image and the acquired depth map. The image processing apparatus can be configured as an image processing apparatus in which the imaging systems, the image forming circuit, and the depth map calculating circuit are removed from the imaging apparatuses according to the first and second embodiments and a data reading device and a network interface are added. The image processing apparatus may acquire two images having a parallax or two images photographed under different shooting conditions through the recording medium or the network and calculate a depth map on the basis of the two images. The image processing apparatus can be configured as an image processing apparatus in which the imaging systems and the image forming circuit are removed from the imaging apparatuses according to the first and second embodiments and a data reading device and a network interface are added.

Further, the viewing image does not always need to be acquired by the photographing. For example, the viewing image may be an image generated by three-dimensional computer graphics. In this case, the depth map represents a depth from an imaginary camera to an object.

As specific implementation on the apparatus, both of implementation by software (a program) and implementation by hardware are possible. For example, it is also possible to store a program in a memory of a computer (a microcomputer, an FPGA, etc.) incorporated in the imaging apparatus or the image processing apparatus and cause the computer to execute the program to realize the respective kinds of processing for attaining the object of the present invention. For this purpose, the program is provided to the computer, for example, through a network or from various types of recording media that can be the storage device (i.e., computer-readable recording media that non-transitorily store data). Therefore, all of the computer (including devices such as a CPU and an MPU), the method, the program (including a program code and a program product), and the computer-readable recording medium that non-transitorily stores the program are included in the scope of the present invention. It is also preferable to provide a dedicated processor such as an ASIC that realizes all or a part of the processing of the present invention with a logic circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-164405, filed on Aug. 7, 2013, which is hereby incorporated by reference herein in its entirety.

What is claimed is:

1. An image processing apparatus comprising:
an image acquisition unit configured to acquire an image;
a depth map acquisition unit configured to acquire a depth map corresponding to the image;
a refinement unit configured to detect a saliency region, which is a region on which a person tends to focus, from the image and to refine the depth map on the basis of the saliency region; and
an image processing unit configured to apply image processing to the image using the depth map refined by the refinement unit,
wherein the image processing unit is configured to divide depths in the depth map into a plurality of depth layers, and the refinement unit is configured to judge whether the saliency region includes depths in two or more depth layers and to refine the depths in the saliency region in the depth map to be smooth when the saliency region is judged to include two or more depth layers.

2. The image processing apparatus according to claim 1, wherein
the depth map acquisition unit is further configured to acquire a reliability of depth calculation in the depth map, and
the refinement unit is configured to refine a depth of a part of the depth map, the part of the depth map being within the saliency region and having the reliability equal to or smaller than a threshold.

3. The image processing apparatus according to claim 1, wherein the saliency region is a region including a character.

4. The image processing apparatus according to claim 1, wherein the saliency region is a region including a straight line.

5. The image processing apparatus according to claim 1, wherein the saliency region is a region with intensity of an edge component equal to or larger than a predetermined threshold.

6. The image processing apparatus according to claim 1, wherein the image processing is blurring processing.

7. The image processing apparatus according to claim 1, wherein the image processing is image restoration processing or super-resolution processing.

8. An imaging apparatus comprising:
the image processing apparatus according to claim 1; and
an image pickup unit configured to convert light from an object into an electric signal and output the electric signal, wherein
an image is acquired by the image acquisition unit on the basis of the electric signal.

9. An image processing apparatus comprising:
an image acquisition unit configured to acquire an image;
a depth map acquisition unit configured to acquire a depth map corresponding to the image and to acquire a reliability of depth calculation in the depth map;
a refinement unit configured to detect a saliency region, which is a region on which a person tends to focus, from the image and to refine the depth map on the basis of the saliency region; and
an image processing unit configured to apply image processing to the image using the depth map refined by the refinement unit,
wherein the refinement unit is configured to refine a depth of a part of the depth map, the part of the depth map being within the saliency region and having the reliability equal to or smaller than a threshold, and to calculate the depth in the part of the depth map by interpolation on the basis of a depth around the part of the depth map.

10. An image processing apparatus comprising:
an image acquisition unit configured to acquire an image;
a depth map acquisition unit configured to acquire a depth map corresponding to the image and to acquire reliability of depth calculation in the depth map;
a refinement unit configured to detect a saliency region, which is a region on which a person tends to focus, from the image and to refine the depth map on the basis of the saliency region; and
an image processing unit configured to apply image processing to the image using the depth map refined by the refinement unit,
wherein the refinement unit is configured to refine a depth of a part of the depth map, the part of the depth map being within the saliency region and having the reliability equal to or smaller than a threshold, and to set all depths in the part of the depth map into any one of the depths in the part of the depth map.

11. The image processing apparatus according to claim 10, wherein the refinement unit is configured to set all the depths in the saliency region into a depth corresponding to a most predominant depth layer among the depth layers included in the saliency region.

12. An image processing method performed by an image processing apparatus, the image processing method comprising:
- an image acquisition step of acquiring an image;
- a depth map acquisition step of acquiring a depth map;
- a detecting step of detecting a saliency region, which is a region on which a person tends to focus, from the image;
- a refinement step of refining the depth map on the basis of the saliency region; and
- an image processing step of applying image processing to the image using the depth map refined in the refinement step,
- wherein the image processing step divides depths in the depth map into a plurality of depth layers, and the refinement step judges whether the saliency region includes depths in two or more depth layers and refines the depths in the saliency region in the depth map to be smooth when the saliency region is judged to include two or more depth layers.

13. The image processing method according to claim 12, wherein
- in the depth map acquisition step, reliability of depth calculation in the depth map is acquired as well, and
- in the refinement step, a depth of a part of the depth map is refined, the part of the depth map being a region within the saliency region and having the reliability equal to or smaller than a threshold.

14. The image processing method according to claim 12, wherein the saliency region is a region including a character, a region including a straight line, or a region with intensity of an edge component equal to or larger than a predetermined threshold.

15. The image processing method according to claim 12, wherein the image processing is blurring processing, image restoration processing, or super-resolution processing.

16. An image processing method performed by an image processing apparatus, the image processing method comprising:
- an image acquisition step of acquiring an image;
- a depth map acquisition step of acquiring a depth map corresponding to the image and acquiring a reliability of depth calculation in the depth map;
- a refinement step of detecting a saliency region, that is a region on which a person tends to focus, from the image, and refining the depth map on the basis of the saliency region; and
- an image processing step of applying image processing to the image using the depth map refined in the refinement step,
- wherein the refinement step refines a depth of a part of the depth map, the part of the depth map being within the saliency region and having a reliability equal to or smaller than a threshold, and all depths in the part of the depth map are set into any one of the depths in the part of the depth map.

17. An image processing method performed by an image processing apparatus, the image processing method comprising:
- an image acquisition step of acquiring an image;
- a depth map acquisition step of acquiring a depth map corresponding to the image and acquiring a reliability of depth calculation for the depth map;
- a refinement step of detecting a saliency region, which is a region on which a person tends to focus, from the image and refining the depth map on the basis of the saliency region, wherein a depth of a part of the depth map that is within the saliency region and that has a reliability equal to or smaller than a threshold is refined; and
- an image processing step of applying image processing to the image using the depth map refined in the refinement step,
- wherein the refinement step calculates the depth in the part of the depth map by interpolation on the basis of a depth around the part of the depth map.

18. A non-transitory computer readable storage medium storing a program which causes a computer to perform an image processing method, the image processing method comprising:
- an image acquisition step of acquiring an image;
- a depth map acquisition step of acquiring a depth map;
- a detecting step of detecting a saliency region, which is a region on which a person tends to focus;
- a refinement step of refining the depth map on the basis of the saliency region; and
- an image processing step of applying image processing to the image using the depth map refined in the refinement step,
- wherein the image processing step divides depths in the depth map into a plurality of depth layers, and the refinement step judges whether the saliency region includes depths in two or more depth layers and to refine the depths in the saliency region in the depth map to be smooth when the saliency region is judged to include two or more depth layers.

19. A non-transitory computer readable storage medium storing a program which causes a computer to perform an image processing method, the image processing method comprising:
- an image acquisition step of acquiring an image;
- a depth map acquisition step of acquiring a depth map corresponding to the image and acquiring a reliability of depth calculation in the depth map;
- a refinement step of detecting a saliency region, that is a region on which a person tends to focus, from the image, and refining the depth map on the basis of the saliency region; and
- an image processing step of applying image processing to the image using the depth map refined in the refinement step,
- wherein the refinement step refines a depth of a part of the depth map, the part of the depth map being within the saliency region and having a reliability equal to or smaller than a threshold, and all depths in the part of the depth map are set into any one of the depths in the part of the depth map.

20. A non-transitory computer readable storage medium storing a program which causes a computer to perform an image processing method, the image processing method comprising:
- an image acquisition step of acquiring an image;
- a depth map acquisition step of acquiring a depth map corresponding to the image and acquiring a reliability of depth calculation for the depth map;
- a refinement step of detecting a saliency region, which is a region on which a person tends to focus, from the image and refining the depth map on the basis of the saliency region, wherein a depth of a part of the depth map that is within the saliency region and that has a reliability equal to or smaller than a threshold is refined; and
- an image processing step of applying image processing to the image using the depth map refined in the refinement step, wherein the refinement step calculates the depth in the part of the depth map by interpolation on the basis of a depth around the part of the depth map.

* * * * *